US012602616B2

(12) United States Patent
Gong et al.

(10) Patent No.: US 12,602,616 B2
(45) Date of Patent: Apr. 14, 2026

(54) SECURE MACHINE LEARNING MODEL TRAINING USING ENCRYPTION

(71) Applicant: Microsoft Technology Licensing, LLC, Redmond, WA (US)

(72) Inventors: Xinwei Gong, Mountain View, CA (US); Abelino E. Jimenez Gajardo, Pleasanton, CA (US); Kinjal Basu, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 715 days.

(21) Appl. No.: 18/056,722

(22) Filed: Nov. 18, 2022

(65) Prior Publication Data

US 2024/0169256 A1     May 23, 2024

(51) Int. Cl.
| | |
|---|---|
| *G06N 20/00* | (2019.01) |
| *H04L 9/00* | (2022.01) |
| *H04L 9/08* | (2006.01) |
| *H04L 9/30* | (2006.01) |

(52) U.S. Cl.
CPC ............. *G06N 20/00* (2019.01); *H04L 9/008* (2013.01); *H04L 9/088* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 9,946,970 | B2 | 4/2018 | Gilad-Bachrach et al. |
| 10,491,373 | B2 | 11/2019 | Jain et al. |

| | | | | |
|---|---|---|---|---|
| 10,554,390 | B2 | 2/2020 | Jain et al. | |
| 2012/0030293 | A1* | 2/2012 | Bobotek | H04L 51/212 |
| | | | | 709/206 |
| 2019/0158439 | A1* | 5/2019 | Tetreault | H04L 51/046 |
| 2021/0058229 | A1 | 2/2021 | Jiang et al. | |
| 2021/0357806 | A1* | 11/2021 | Sun | G06N 3/045 |
| 2021/0398017 | A1* | 12/2021 | Garg | H04L 9/50 |
| 2022/0067181 | A1* | 3/2022 | Carley | H04L 9/0618 |
| 2022/0385449 | A1* | 12/2022 | Brochonski | G06N 20/00 |
| 2023/0081162 | A1* | 3/2023 | Lee | G06F 18/2415 |
| | | | | 380/28 |
| 2023/0119749 | A1* | 4/2023 | Micciancio | H04L 9/0618 |
| | | | | 380/277 |
| 2023/0208875 | A1* | 6/2023 | Do | H04L 63/1425 |
| | | | | 726/22 |

(Continued)

FOREIGN PATENT DOCUMENTS

| | | | | |
|---|---|---|---|---|
| WO | WO-2018102861 | A1 * | 6/2018 | G06Q 10/10 |

OTHER PUBLICATIONS

Faster secure data mining via distributed homomorphic encryption, Li et al (Year: 2020).*

(Continued)

*Primary Examiner* — Augustine K. Obisesan

(74) *Attorney, Agent, or Firm* — Nicholson De Vos Webster & Elliott LLP

(57) ABSTRACT

Embodiments of the disclosed technologies include, at a data processor, extracting a subset of messages, creating a set of training samples, creating an encrypted training set, and sending the encrypted training set to a model training system, and, at the model training system, labeling the encrypted training set, training the machine learning model, and decrypting the trained machine learning model.

20 Claims, 6 Drawing Sheets

(56)          References Cited

U.S. PATENT DOCUMENTS

2023/0267375  A1 *    8/2023   Szeto  ..................... G16H 50/20
                                                              706/10
2023/0370320  A1 *   11/2023   Green  ..................... H04L 41/16
2023/0401285  A1 *   12/2023   Kobren  ................ G06F 18/214

OTHER PUBLICATIONS

Alloghani, et al., "A Systematic Review on the Status and Progress
of Homomorphic Encryption Technologies", In Journal of Informa-
tion Security and Applications, Oct. 1, 2019, 14 Pages.
Lee. et al., "Privacy-Preserving Text Classification on BERT Embed-
dings with Homomorphic Encryption", In Human Language Tech-
nologies, pp. 3169-3175, Jul. 10-15, 2022, 7 Pages.

* cited by examiner

Figure 3:
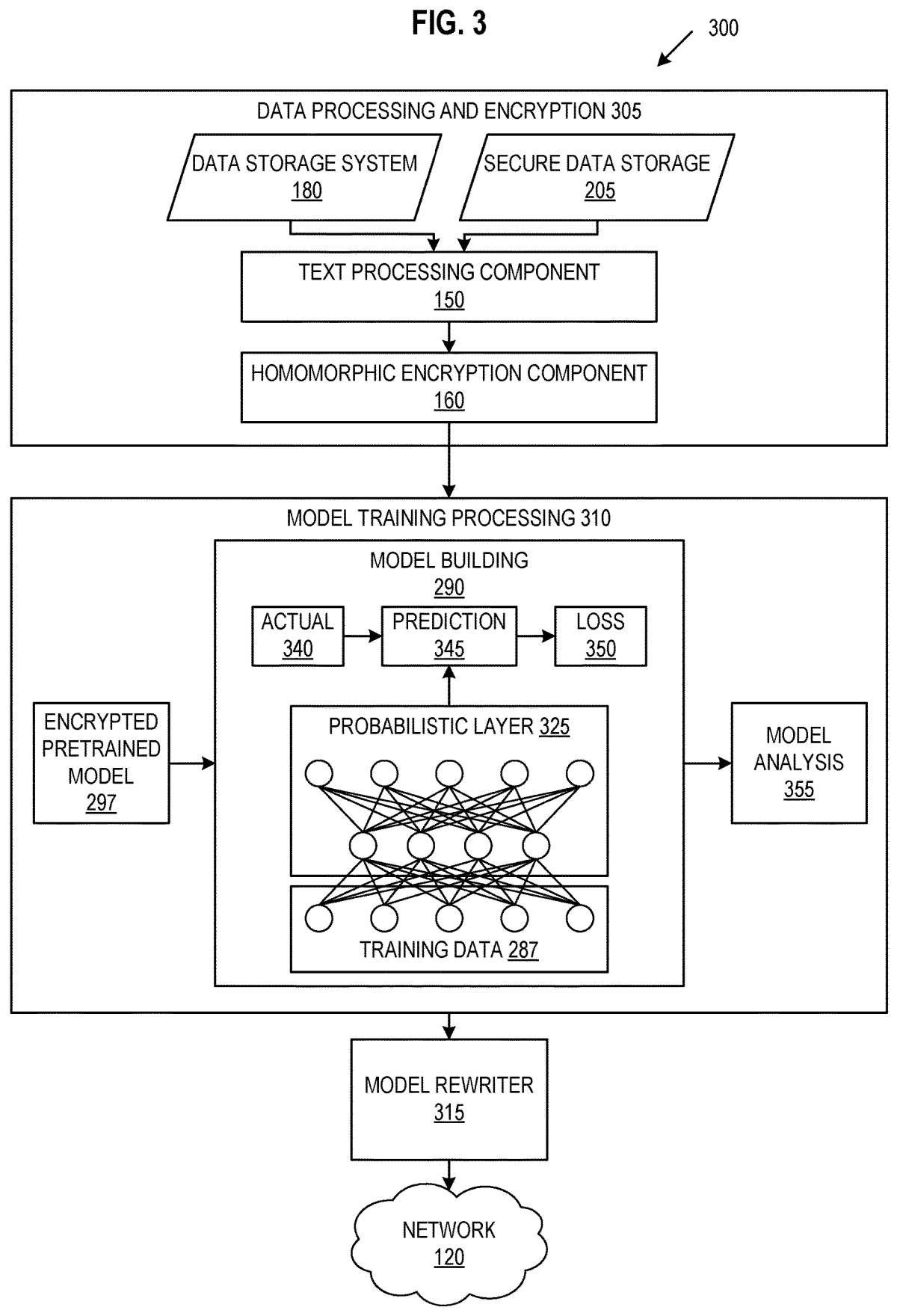

DATA PROCESSING AND ENCRYPTION 305

DATA STORAGE SYSTEM
180

SECURE DATA STORAGE
205

TEXT PROCESSING COMPONENT
150

HOMOMORPHIC ENCRYPTION COMPONENT
160

MODEL TRAINING PROCESSING 310

MODEL BUILDING
290

ACTUAL
340

PREDICTION
345

LOSS
350

ENCRYPTED PRETRAINED MODEL
297

PROBABILISTIC LAYER 325

TRAINING DATA 287

MODEL ANALYSIS
355

MODEL REWRITER
315

NETWORK
120

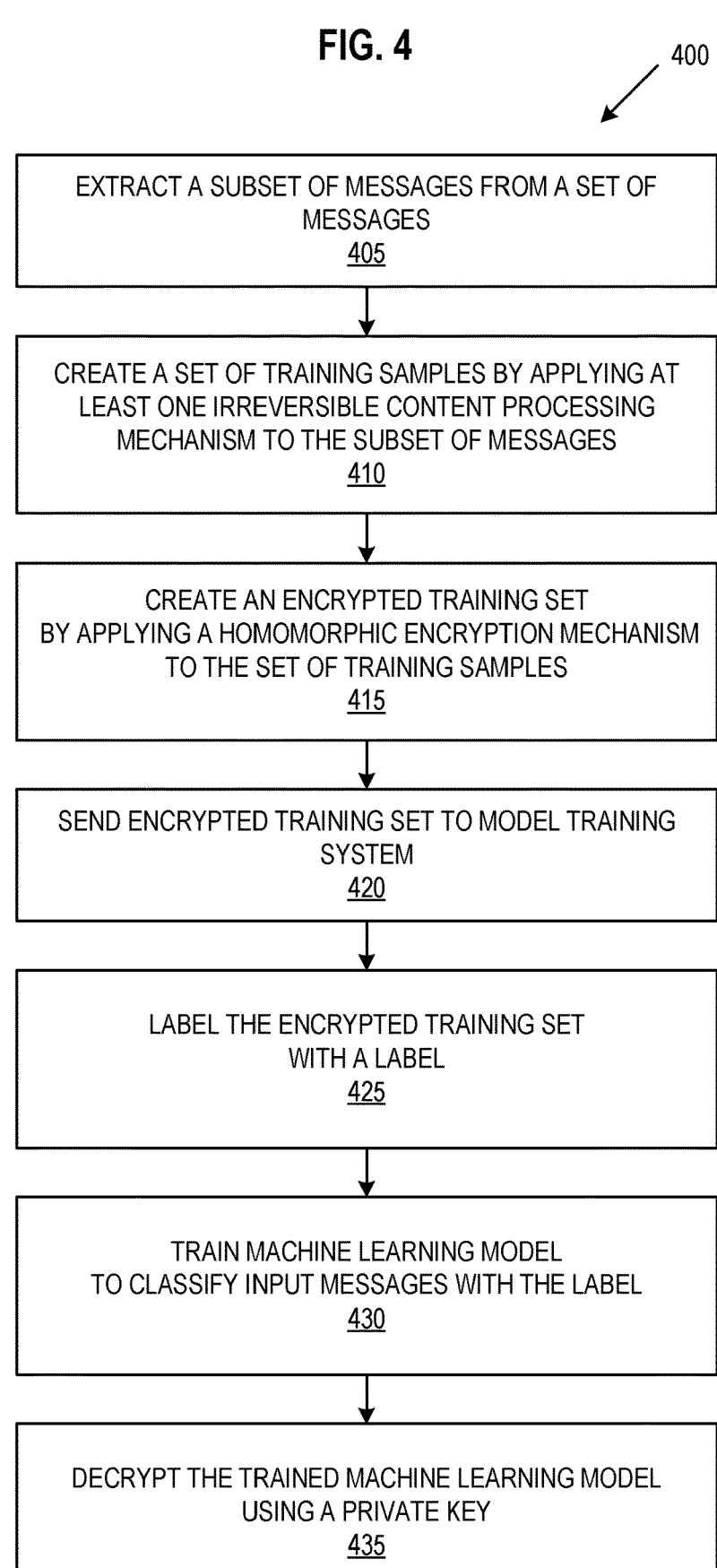

EXTRACT A SUBSET OF MESSAGES FROM A SET OF
MESSAGES
405

CREATE A SET OF TRAINING SAMPLES BY APPLYING AT
LEAST ONE IRREVERSIBLE CONTENT PROCESSING
MECHANISM TO THE SUBSET OF MESSAGES
410

CREATE AN ENCRYPTED TRAINING SET
BY APPLYING A HOMOMORPHIC ENCRYPTION MECHANISM
TO THE SET OF TRAINING SAMPLES
415

SEND ENCRYPTED TRAINING SET TO MODEL TRAINING
SYSTEM
420

LABEL THE ENCRYPTED TRAINING SET
WITH A LABEL
425

TRAIN MACHINE LEARNING MODEL
TO CLASSIFY INPUT MESSAGES WITH THE LABEL
430

DECRYPT THE TRAINED MACHINE LEARNING MODEL
USING A PRIVATE KEY
435

SECURE MACHINE LEARNING MODEL TRAINING USING ENCRYPTION

TECHNICAL FIELD

The present disclosure generally relates to machine learning models, and more specifically, relates to generating training data for machine learning models.

BACKGROUND

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block diagram of an exemplary computing system 300 that includes a text processing component 150 and a homomorphic encryption component 160 in accordance with some embodiments of the present disclosure.

FIG. 4 is a flow diagram of an example method 400 to train machine learning models using encryption in accordance with some embodiments of the present disclosure.

DETAILED DESCRIPTION

Aspects of the present disclosure are directed to generating training data for machine learning models using encryption. The disclosed generation and training methods are useful for training and/or operating machine learning models, including machine learning models that run on secure data.

Machine learning models are based on data sets. In many cases, data sets are processed in order to create the inputs to which a machine learning model is applied. These data sets are typically stored in general-purpose storage clusters accessible to engineers working on the machine learning models. Not all data sets are stored in accessible data clusters, however. For example, individually identifiable information and other sensitive private data are stored in secure clusters that restrict access to the sensitive data.

The traditional way to train machine learning models on secure data is to anonymize the data and remove individually identifiable information. Anonymization does not work for all kinds of data, however. For example, messaging data can contain a lot of personal identifiable information even if anonymization is used to remove phone numbers, zip codes, and other easy-to-detect identifiable aspects. It is therefore very difficult to train machine learning on secure data that cannot be easily anonymized Additionally, anonymization is not always guaranteed to remove all individually identifiable information.

Aspects of the present disclosure address the above and other deficiencies by using encryption to train machine learning models on secure data. The disclosed approaches allow secure data to be used to train machine learning models. As such, the disclosed approaches enable machine learning models to be trained with data that previously would have been unavailable for use as training data. These improvements to machine learning model training allow previously unusable secure data sets to be used for training and therefore allow implementations of machine learning models that were previously impossible or impractical. Additionally, by providing a larger pool of training data, including data that was not previously available for use as training data due to its sensitive nature, the disclosed approaches can improve the accuracy of machine learning model outputs. Improved machine learning model output can improve decisions made by downstream processes and systems.

Figure 1:
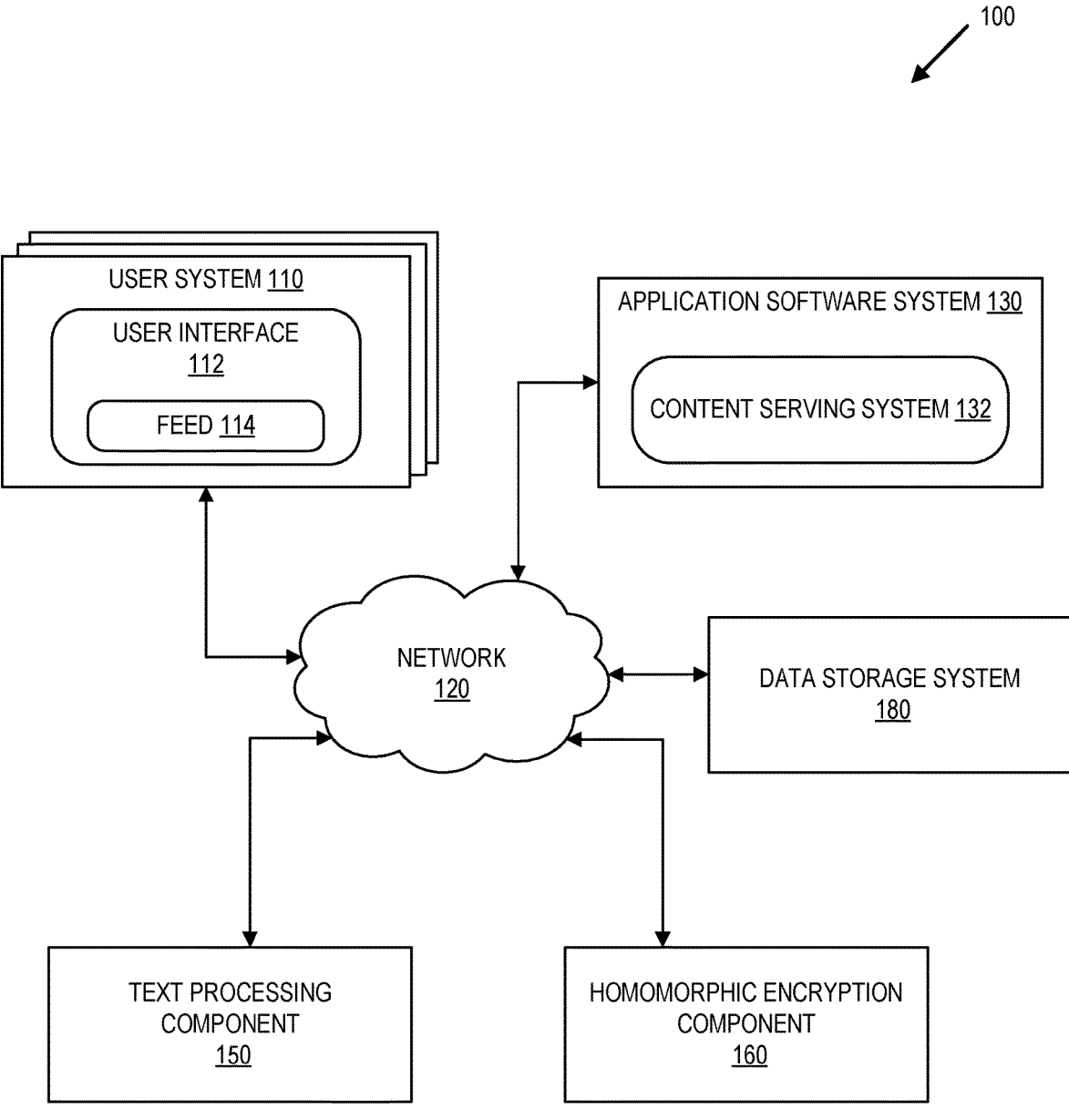
FIG. 1 illustrates an example computing system 100 that includes a text processing component 150 and a homomorphic encryption component 160 in accordance with some embodiments of the present disclosure.

In the embodiment of FIG. 1, computing system 100 includes a user system 110, a network 120, an application software system 130, a data store 140, a text processing component 150, and a homomorphic encryption component 160. Additional components shown in FIG. 2 and FIG. 3, described below, are sub-components of text processing component 150 or homomorphic encryption component 160, in come implementations.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

Figure 5:
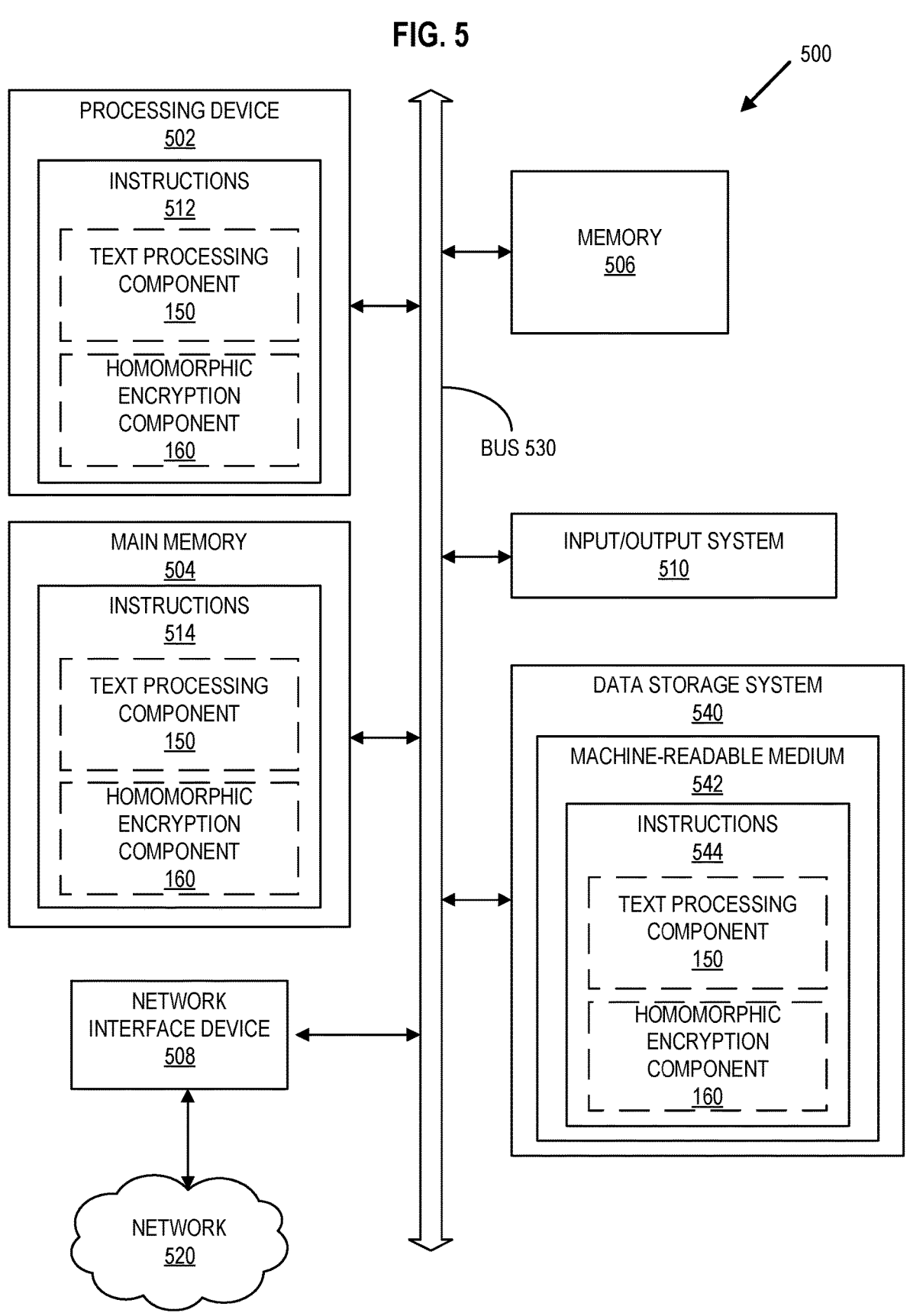
FIG. 5 is a block diagram of an example computer system 500 in which embodiments of the present disclosure can operate.

The computing system 100 includes a text processing component 150 that can generate processed positive data (e.g., data that is positively associated with a label, such as data identified as abusive) and processed negative data (e.g., data that is negatively associated with a label, such as data identified as non-abusive) from positive and negative messages to prepare the data for encryption and input into a machine learning model. In some embodiments, the positive messages are labeled as positively associated with a label by a human. For example, the positive messages are messages determined to be abusive by, for example, human reviewers or rule-based systems. In other embodiments, the positive messages are labeled as positively associated with a label by a machine learning model that has been trained to classify messages with a positive label or a negative label. For example, the positive messages are messages determined to be abusive by a classification machine learning model. In some embodiments, the application software system 130 includes at least a portion of the text processing component 150. As shown in FIG. 5, the text processing component 150 can be implemented as instructions stored in a memory, and a processing device 502 can be configured to execute the instructions stored in the memory to perform the operations described herein.

The computing system 100 also includes a homomorphic encryption component 160 that can perform homomorphic encryption on processed data to generate encrypted data. In some embodiments, the application software system 130 includes at least a portion of the homomorphic encryption component 160. As shown in FIG. 5, the homomorphic encryption component 160 can be implemented as instructions stored in a memory, and a processing device 502 can be configured to execute the instructions stored in the memory to perform the operations described herein. In some implementations, text processing component 150 and homomorphic encryption component 160 are implemented on the same device or system. In other implementations, text processing component 150 and homomorphic encryption component 160 are implemented on different devices or systems.

Further details regarding the operations of the text processing component 150 and the homomorphic encryption component 160 are described below.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Application software system 130 is any type of application software system that includes or utilizes functionality provided by text processing component 150 and homomorphic encryption component 160. Examples of application software system 130 include but are not limited to connections network software, such as social media platforms, and systems that are or are not be based on connections network software, such as general-purpose search engines, search software, online social networks, sales assistance software, advertising software, learning and education software, or any combination of any of the foregoing.

While not specifically shown, it should be understood that any of user system 110, application software system 130, data store 140, text processing component 150, and homomorphic encryption component 160 includes an interface embodied as computer programming code stored in computer memory that when executed causes a computing device to enable bidirectional communication with any other of user system 110, application software system 130, data store 140, text processing component 150, and homomorphic encryption component 160 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, data store 140, text processing component 150, and homomorphic encryption component 160 is implemented using at least one computing device that is communicatively coupled to electronic communications network 120. Any of user system 110, application software system 130, data store 140, text processing component 150, and homomorphic encryption component 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, text processing component 150, and/or homomorphic encryption component 160. User system 110 is configured to communicate bidirectionally with any of application software system 130, data store 140, text processing component 150, and/or homomorphic encryption component 160 over network 120.

The features and functionality of user system 110, application software system 130, data store 140, text processing component 150, and homomorphic encryption component 160 are implemented using computer software, hardware, or software and hardware, and can include combinations of automated functionality, data structures, and digital data, which are represented schematically in the figures. User system 110, application software system 130, data store 140, text processing component 150, and homomorphic encryption component 160 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

The computing system 100 also includes a homomorphic encryption component 160 that can perform homomorphic encryption on processed data to generate encrypted data. In some embodiments, the application software system 130 includes at least a portion of the homomorphic encryption component 160. As shown in FIG. 5, the homomorphic encryption component 160 can be implemented as instructions stored in a memory, and a processing device 502 can be configured to execute the instructions stored in the memory to perform the operations described herein.

The disclosed technologies can be described with reference to an example use case of generating training data using encryption for a machine learning model used to classify messages; for example, messages between users in a social graph application such as an online network. The disclosed technologies are not limited to social graph applications but can be used to generate training data using encryption for machine learning models generally. The disclosed technologies can be used by many different types of network-based applications in which there is messaging functionality and classifying messages is useful.

Figure 2A:
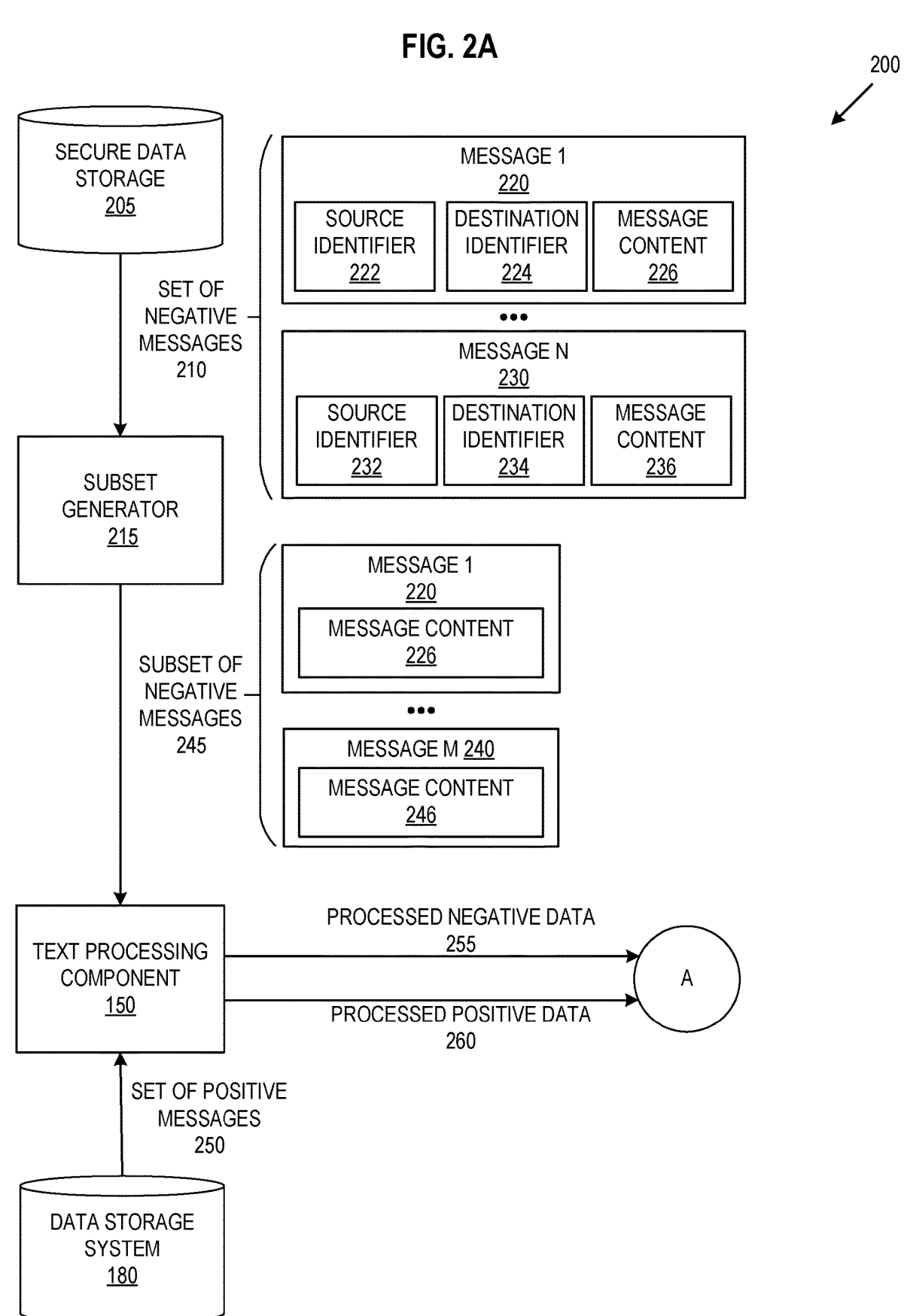
FIGS. 2A and 2B are block diagrams of an exemplary computing system 200 that includes a text processing component 150 and a homomorphic encryption component 160 in accordance with some embodiments of the present disclosure.
Figure 2B:
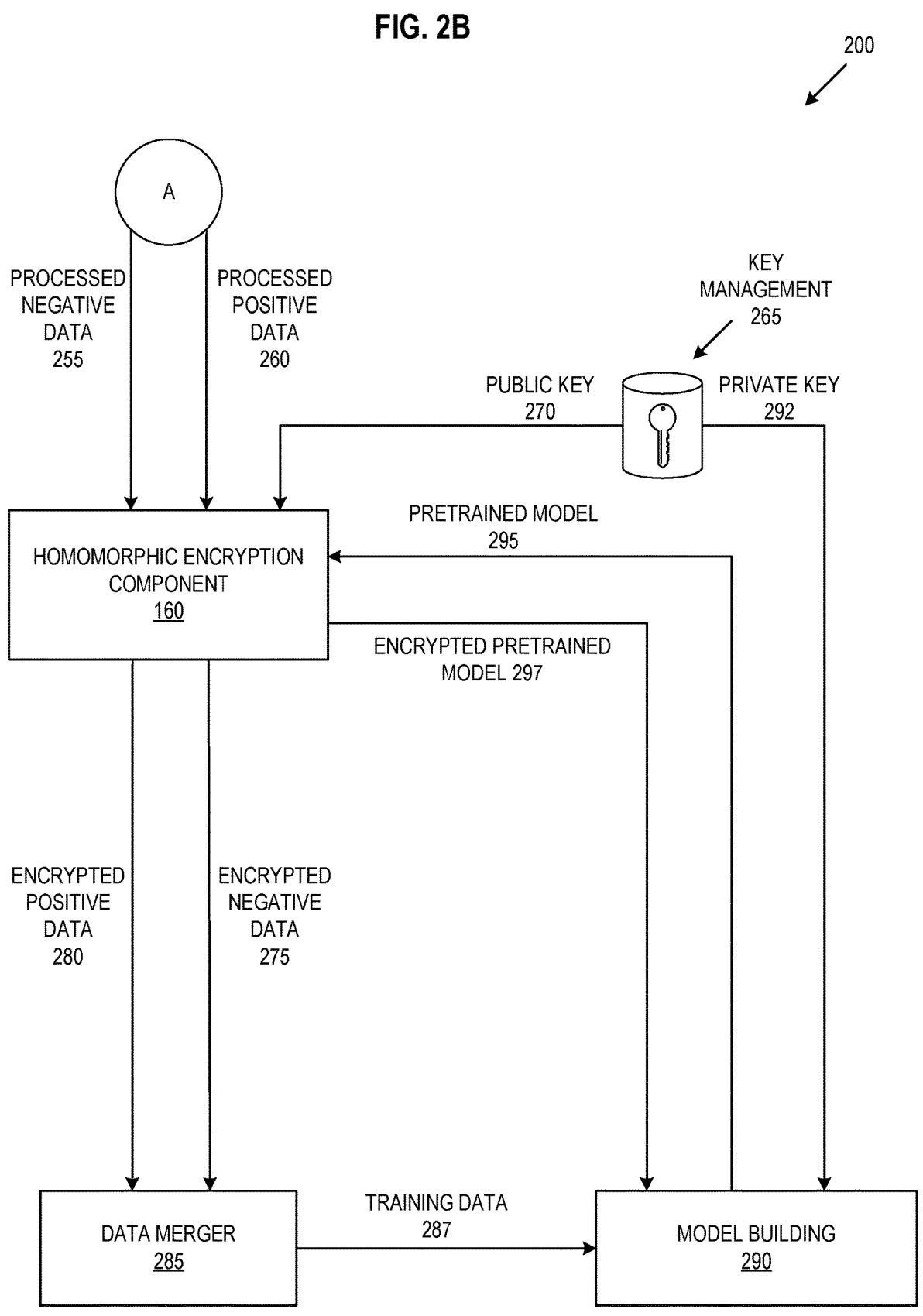

FIGS. 2A and 2B are block diagrams of an exemplary computing system 200 that includes text processing component 150 and homomorphic encryption component 160 in accordance with some embodiments of the present disclosure. In some embodiments, text processing component 150 is implemented in a data processor, such as processing device 502 of FIG. 5. Similarly, in some embodiments, homomorphic encryption component 160 is implemented in a data processor, such as processing device 502 of FIG. 5. Exemplary computing system 200 includes a model building component 290, data storage system 180, and a secure data storage 205. Model building 290 and/or secure data storage 205 are part of an application software system, such as application software system 130 of FIG. 1, in some implementations. Secure data storage 205 and/or model building 290 are part of text processing component 150 or homomorphic encryption component 160, in some implementations. Data storage system 180 and secure data storage 205 each have a location identifier such that exemplary computing system 200 can determine whether messages came from data storage system 180 or secure data storage 205 using the location identifier. In some implementations, model building 290 is a component of a model training system, and the model training system is a component of application software system 130, text processing component 150, or homomorphic encryption component 160.

In some embodiments secure data storage 205 is a data storage component that hosts individually identifiable information and other sensitive private data, such as data pertaining to a users' personal attributes, activities, and online interactions. This data is very sensitive and secure data storage 205 is therefore inaccessible to most components of the user system (e.g., user system 110 of FIG. 1) and application software system (e.g., application software system 130 of FIG. 1). In particular, secure data storage 205 is inaccessible to machine learning model computer clusters and model training pipelines that would be accessible to engineers who work on the model training pipelines. In some embodiments, secure data storage 205 hosts messages between users of a social media platform including set of negative messages 210.

As shown in FIG. 2A, secure data storage 205 sends a set of negative messages 210 to a subset generator component 215. Set of negative messages 210 is a set of messages labeled as negative with respect to a specific label or classification. For example, set of negative messages 210 is a set of messages labeled as non-abusive by human reviewers or rule-based systems. In some embodiments, the set of negative messages 210 is labeled as non-abusive (e.g., negative) by a machine learning model. In other embodiments, set of negative messages 210 is assumed to be negative since set of negative messages 210 is a general set of messages and rates of abusive messages are inherently low. Further details regarding set of negative messages 210 are described below. Although illustrated separately, in some embodiments, secure data storage 205 is included in data storage system 180. Likewise, although illustrated separately, in some embodiments, subset generator 215 is included in text processing component 150.

In some embodiments, set of negative messages 210 includes messages 1 220 through N 230. Although only two messages are illustrated, set of negative messages 210 can include any number of stored messages between users. Additionally, although illustrated and described as messages, exemplary computing system 200 may operate on various different kinds of data. For example, set of negative messages 210 can include any kind of sensitive private data that would be otherwise be inaccessible to machine learning model compute clusters and model training pipelines. Message 1 220 includes source identifier 222, destination identifier 224, and message content 226. Message N 230 includes source identifier 232, destination identifier 234, and message content 236. Source identifiers 222 and 232 identify the source of the corresponding message (e.g., message 1 220 or message N 230), and include, for example, a user identifier, a device identifier, or a network address. Similarly, destination identifiers 224 and 234 identify the recipient of the corresponding message. Message content 226 and 236 includes the actual content of the message sent. For example, message content 226 may include plain text, links, images, videos, and other digital media which can be sent through a digital platform. In some embodiments, messages 1 220 through N 230 include one or two of source identifiers 222 and 232, destination identifiers 224 and 234, and message content 226 and 236.

Subset generator 215 receives set of negative messages 210 and uses them to generate subset of negative messages 245. In some embodiments, subset generator 215 generates subset of negative messages 245 by randomly sampling a given number of messages from set of negative messages 210. The given number of messages to be sampled may be predetermined or may be determined based on other aspects of the system implementation (e.g., the number of messages in set of positive messages 250 or the total number of messages in set of negative messages 210). In some embodiments, the given number of messages to be sampled is based on previous tests determining an optimal sample size. In some embodiments, the given number of messages to be sampled is based on a predetermined relationship between the number of positive messages and negative messages. For example, the given number of messages to be sampled may be set such that there is a ratio of 1:1.5 between the number of positive messages and the number of negative messages.

Subset of negative messages 245 includes messages 1 220 to M 240. Subset of negative messages 245 is a subset of set of negative messages 210 such that every message included in subset of negative messages 245 is also included in set of negative messages 210. Although only two messages are illustrated, subset of negative messages 245 can include any number of messages from 1 to N (N being the number of messages in set of negative messages 210). In some embodiments, as shown in FIGS. 2A and 2B, message 1 220 and message M 240 of subset of negative messages 245 include message content 226 and 246. In such embodiments, subset generator 215 samples the raw message (e.g., only message content) for each of the messages chosen for subset of negative messages 245. By creating subset of negative messages 245, subset generator not only reduces the amount of data (since subset of negative messages 245 is smaller or equal to set of negative messages 210) but also removes source and destination identifiers so messages in subset of negative messages 245 cannot be directly attributed to a user. Subset generator 215 sends subset of negative messages 245 to text processing component 150.

Data storage system 180 sends set of positive messages 250 to text processing component 150. Set of positive messages 250 is a set of messages that are determined to be positive. For example, set of positive messages 250 includes messages positively identified as being abusive messages. In some embodiments, the set of positive messages 250 are positively identified as being abusive by human operators or rule-based systems. In some embodiments, each message in set of positive messages 250 includes associated message content.

Text processing component 150 receives subset of negative messages 245 and uses them to generate processed negative data 255. Text processing component 150 also receives set of positive messages 250 and uses them to generate processed positive data 260. In some embodiments, text processing component 150 performs text preprocessing, tokenization, and embedding on set of positive messages 250 and subset of negative messages 245 to generate processed positive data 260 and processed negative data 255 respectively. Text processing component 150 performs text preprocessing to mask sensitive information included in set of positive messages 250 and subset of negative messages 245. For example, text processing component 150 identifies and removes sensitive information from the message content (e.g., message content 226 and 246). This sensitive information may include email addresses, URLs, dates, phone numbers, and other numbers. In some embodiments, text preprocessing also includes text processing component 150 replacing shortened expressions (e.g., apostrophes and abbreviations) and removing punctuation and extra white spaces from set of positive messages 250 and subset of negative messages 245. In some embodiments text processing component 150 also removes text exceeding a predetermined number of characters or removes data with text exceeding a predetermined number of characters.

Text processing component 150 also performs tokenization on the preprocessed data for set of positive messages 250 and subset of negative messages 245 to transform the text data into a numerical representation that can be processed by machine learning algorithms (e.g., a one-hot encoded numerical 2D array). Text processing component 150 performs an embedding operation on the tokenized data for set of positive messages 250 and subset of negative messages 245 to produce an embedded representation of the numerical representation. For example, text processing component 150 transforms the tokenized data into a smaller embedded space while retaining the textual information. Examples of embedding operations include but are not limited to Google Bidirectional Encoder Representations from Transformers (BERT) and Global Vectors for Word Representation (GloVe). In some embodiments, text processing component 150 uses a non-reversible embedding operation such that the result cannot be used to reproduce the input. By using non-reversible embedding operations as well as other techniques (e.g., masking sensitive information and removing source and destination identifiers), the processed messages are usable to train machine learning models while still preserving privacy. Text processing component 150 sends the embedded representation (processed positive data 260 and processed negative data 255) to homomorphic encryption component 160.

Key management 265 sends public key 270 to homomorphic encryption component 160. Although illustrated separately, in some embodiments, key management 265 is included in homomorphic encryption component 160. In some embodiments, key management 265 and homomorphic encryption component 160 use asymmetric homomorphic encryption to encrypt processed negative data 255 and processed positive data 260. Key management 265 therefore sends public key 270 to homomorphic encryption component 160 for encrypting processed negative data 255 and processed positive data 260. Due to the mathematical relationship between public key 270 and private key 292, public key 270 is used to encrypt the data but private key 292 must be used to decrypt the data. In some embodiments, key management 265 and homomorphic encryption component 160 use symmetric homomorphic encryption to encrypt processed negative data 255 and processed positive data 260. In such embodiments, key management 265 would not use public key 270 and would instead use private key 292.

Homomorphic encryption component 160 receives processed negative data 255 and public key 270 and generates encrypted negative data 275. Homomorphic encryption component 160 also receives processed positive data 260 and uses public key 270 to generate encrypted positive data 280. In some embodiments, homomorphic encryption component 160 uses an encoding operation to transform the embedded representation (processed negative data 255 and processed positive data 260) into an encoded representation in a numerical space to prepare the data for encryption. In some embodiments, text processing component 150 performs the encoding operation rather than homomorphic encryption component 160. Homomorphic encryption component 160 uses a homomorphic encryption scheme to encrypt the encoded data into ciphertext. For example, homomorphic encryption component 160 uses a homomorphic encryption scheme that preserves some mathematical structure of the data such that mathematical operations can still be performed on the encrypted data (e.g., encrypted positive data 280, encrypted negative data 275, and encrypted pretrained model 297). By way of example, an encryption scheme that is homomorphic with respect to the addition operation will satisfy the following equation: Dec(Enc(x)+Enc(y))=x+y, and an encryption scheme that is homomorphic with respect to the addition operation will satisfy the following equation: Dec(Enc(x)*Enc(y))=x*y, where x and y are variables, Dec( ) refers to the homomorphic decrypting operation and Enc( ) refers to the homomorphic encrypting operation.

In some embodiments, exemplary computing system 200 uses polynomial approximation of nonlinear functions (e.g., using Taylor's expansion) to approximate the nonlinear functions on homomorphically encrypted data. Further aspects of the homomorphic encryption scheme as relevant to the model training process are described with reference to FIG. 3. In some embodiments, homomorphic encryption component 160 uses a Cheon, Kim, Kim, and Song (CKKS) homomorphic encryption scheme. As explained above, decryption of encrypted negative data 275 and encrypted positive data 280 is only possible through use of private key 292. Homomorphic encryption component 160 sends encrypted positive data 280 and encrypted negative data 275 to data merger 285.

In some embodiments, as shown in FIG. 2B, model building 290 sends pretrained model 295 to homomorphic encryption component 160. In such embodiments, homomorphic encryption component 160 generates encrypted pretrained model 297 using pretrained model 295 and public key 270. In some embodiments, encrypted pretrained model 297 is a model pretrained on data that is not encrypted. In some embodiments, pretrained model 295 is a model trained on proxy data for subset of negative messages 245. For example, for the use case of classifying messages as abusive or not abusive, pretrained model 295 is trained using publicly available proxies for non-abusive messages. The proxies are not actual messages between users but rather information that can be used to approximate messages. In such embodiments, because these proxies may contain the same information as user-to-user messages (e.g., text, images, sound, and/or video) and serve a similar purpose (e.g., communicating with another user), they are used as an approximation for user-to-user messages. In some embodiments, pretrained model 295 is also trained on processed positive data 260. Homomorphic encryption component 160 homomorphically encrypts pretrained model 295 using public key 270. Homomorphic encryption component 160 sends encrypted pretrained model 297 to model building 290. Pretrained model 295 and encrypted pretrained model 295 are stored in, for example, one or more computers of data storage system 180 and/or secure data storage 205.

A data merger component 285 receives encrypted positive data 280 and encrypted negative data 275 and generates training data 287. While illustrated separately, in some embodiments data merger 285 is included in homomorphic encryption component 160. In some embodiments, data merger 285 is included in model building 290, and model building 290 may be included in homomorphic encryption component 160. In some implementations, a model training system includes data merger 285 and model building 290.

Data merger 285 labels encrypted positive data 280 and encrypted negative data 275. For example, encrypted positive data 280 is generated from abusive messages (e.g., set of positive messages 250) and is therefore labeled as abusive while encrypted negative data 275 is generated from regular messages (e.g., subset of negative messages 245) and therefore assumed to be non-abusive and labeled as such. In some embodiments, data merger 285 uses the location identifier which identifies where the data came from (e.g., data storage system 180 or secure data storage 205) and classifies the data from data storage system 180 as abusive and the data from secure data storage 205 as non-abusive. Although not all data from encrypted negative data 275 is guaranteed to be non-abusive, given the rare occurrence of abusive behavior, data merger 285 assumes that messages in encrypted negative data 275 are non-abusive. In some embodiments, exemplary computing system 200 manually classifies subset of negative messages 245. For example, in systems where there is a higher expectation of abusive behavior or applicable classifier, subset generator 215 only includes messages that are identified as non-abusive in subset of negative messages 245. In some embodiments, set of negative messages 210 only includes messages that are identified as non-abusive. Data merger 285 sends training data 287 to model building 290.

In some embodiments, the labels associated with each of encrypted positive data 280 and encrypted negative data 275 are not encrypted. In other embodiments, the labels for encrypted positive data 280 are encrypted and the labels for encrypted negative data 275 are not encrypted. Similarly, in still other embodiments, the labels for encrypted negative data 275 are encrypted and the labels for encrypted positive data 280 are not encrypted. In some embodiments, only parts of encrypted positive data 280 and encrypted negative data 275 are encrypted. Because training and executing machine learning models on encrypted data is very processing intensive, model building 290 reduces the computational time required for training and executing the machine learning models by providing flexibility on which portions of the training data is encrypted.

Although not illustrated, in some embodiments, data merger 285 also sends training data 287 to data storage system 180 for storage and future use. Because training data 287 has been homomorphically encrypted, training data 287 can be stored on a more general-purpose compute cluster (rather than a restricted cluster such as secure data storage 205) where training data 287 can be retrieved and used to train other machine learning models.

Key management 265 sends private key 292 to model building 290. As explained above, private key 292 is mathematically associated with public key 270 such that data encrypted by public key 270 can only be decrypted by private key 292.

Model building 290 receives training data 287 and private key 292 and builds a machine learning model. For example, training data 287 may include data x representing the processed and encrypted representation of message content as well as label y representing the associated labels (e.g., abusive or non-abusive). Model building 290 uses training data 287 to train a set of model weights w, such that $y=w \circ x$, where $\circ$ signifies a mathematical operation composed only of additions and multiplications such that the homomorphically encrypted weights w can be decrypted. In some embodiments, the desired mathematical operation is a nonlinear function and $\circ$ signifies a mathematical operation composed only of additions and multiplications which approximates the desired operation (e.g., using a Taylor's expansion to approximate the function as a representation of polynomials using only addition and multiplication). Model building 290 therefore uses training data 287 composed of homomorphically encrypted data (e.g., encrypted positive data 280 and encrypted negative data 275) to generate model weights and therefore a machine learning model that is also homomorphically encrypted and capable of being decrypted using private key 292. For example, the model weights w, data x, and label y satisfy the following equation: $Enc(y)=Enc(w \circ x)=Enc(w) \circ Enc(x)$.

In some embodiments, model building 290 determines hyperparameters for building the machine learning model based on the number of operations required for the approximation of the desired operation. For example, model building 290 sets the hyperparameters such that the number of operations required to approximate the desired operation does not exceed a threshold number of operations. Model building 290 can therefore set the hyperparameters so that the desired operation is not a complex nonlinear operation which may require an approximation using a number of operations that cause excess errors. In some embodiments, the threshold number of operations is predetermined based on data from testing trained machine learning models. In some embodiments, model building 290 determines the threshold number of operations by testing machine learning models and determining the number of errors. In some embodiments, model building 290 determines the hyperparameters based on the encryption scheme. For example, model building 290 determines uses hyperparameters that cause the approximation of the desired operation to not exceed a number of operations determined by the homomorphic encryption scheme used to encrypt the training data. In some embodiments, model building 290 determines the hyperparameters based on a number of mathematical operations computed at a node of the machine learning model, a number of mathematical operations computed at a layer of the machine learning model, a total number of mathematical operations computed during a training step of the model building, or a number of layers of the machine learning model.

In some embodiments, model building 290 also receives encrypted pretrained model 297 and fine tunes (e.g., performs additional training on) encrypted pretrained model 297 using training data 287 and private key 292. In such embodiments, model building 290 receives encrypted pretrained model 297 which is a homomorphically encrypted version of pretrained model 295 trained on proxies for encrypted negative data 275. Using the same mathematical principles of machine learning model weights and homomorphic encryption described above, model building 290 fine tunes encrypted pretrained model 297 using training data 287. Further aspects of the model training as described with reference to FIG. 3.

FIG. 3 is a block diagram of an exemplary computing system 300 in accordance with some embodiments of the present disclosure. Exemplary computing system 300 includes data processing and encryption system 305, model training processing system 310, model rewriter component 315, and network 120.

Data processing and encryption 305 includes data storage system 180, secure data storage 206, text processing component 150, and homomorphic encryption component 160. In some embodiments, portions of data processing and encryption 305 are implemented in text processing component 150, homomorphic encryption component 160, and application software system 130. As explained with reference to FIGS. 2A and 2B, text processing component 150 receives positive messages and negative messages (e.g., set of negative messages 210 or subset of negative messages 245 and set of positive messages 250 of FIG. 2A) from data storage system 180 and secure data storage 205 respectively. Text processing component 150 preprocesses, tokenizes, and embeds the content of the messages to create processed data (e.g., processed positive data 260 and processed negative data 255 of FIGS. 2A and 2B). Text processing component 150 sends the processed data to homomorphic encryption component 160.

As explained also with reference to FIGS. 2A and 2B, homomorphic encryption component 160 receives the processed data (e.g., processed positive data 260 and processed negative data 255 of FIGS. 2A and 2B), encodes the processed data, and encrypts the processed data generate encrypted data (e.g., encrypted positive data 280 and encrypted negative data 275 of FIG. 2B). Although not illustrated, in some embodiments, homomorphic encryption component 160 receives a pretrained model (e.g., pretrained model 295 of FIG. 2B) from model training processing 310 and generates encrypted pretrained model 297. For example, homomorphic encryption component 160 uses a public key (e.g., public key 270 of FIG. 2B) and encrypts the pretrained model. In such embodiments, homomorphic encryption component 160 sends encrypted pretrained model 297 to model training processing 310 for further model building and fine tuning. In some implementations, model training processing system 310 and its sub-components are included in homomorphic encryption component 160.

Model building 290 is a component for training, validating, and executing a machine learning model. In some embodiments, model building 290 is a component for training, validating, and executing a neural network, such as a Bayesian neural network, which classifies inputs based on training data. For example, model building 290 uses training data 287 as inputs and creates a neural network with hidden layers such as probabilistic layer 325. Model building 290 generates prediction 345 using probabilistic layer 325. For example, model building 290 calculates gradients and applies backpropagation to training data 287. Prediction 345 is a predicted classification for training data 287. Model building 290 compares prediction 345 to actual 340 which is the actual classification for the associated training data 287. For example, training data 287 may include encrypted positive data 280 which are classified as abusive messages and encrypted negative data 275 which are classified as non-abusive messages. In some embodiments, abusive messages may be messages containing nudity, harassment, foul language, spam, threats, etc. where non-abusive messages are messages that do not contain nudity, harassment, foul language, spam, threats, etc. The training data contains the particular type of abusive content that is sought to be detected in a particular implementation.

Model building 290 generates loss 350 based on the difference between actual 340, the actual classification and prediction 345, the predicted classification. For example, model building 290 generates loss 350 based on whether the training data 287 is correctly classified as abusive or non-abusive messages and therefore trains the machine learning model to identify whether messages are abusive or non-abusive. In some embodiments, the loss is a validation loss. In some embodiments, because the inputs to model building 290 (e.g., encrypted pretrained model 297 and training data 287) are encrypted, loss 350 is also encrypted. Model building 290 therefore decrypts loss 350 to update the machine learning model. For example, model building 290 receives a private key, such as private key 292 from FIG. 2B, and decrypts loss 350 using the private key. Model building 290 uses the decrypted loss to update the machine learning model. In some embodiments, model building 290 determines whether the validation loss (i.e., loss 350) satisfies a validation loss threshold. The validation loss threshold is a threshold that determines an acceptable accuracy for model building 290. If the validation loss exceeds the validation loss threshold, model building 290 sends the trained machine learning model to a model serving system. In some embodiments, model building 290 uses encrypted pretrained model 297 as a base and fine tunes encrypted pretrained model 297 using training data 287.

A model analysis component 355 receives a trained machine learning model from model building 290 and, in some embodiments, decrypts the trained machine learning model. For example, model analysis 355 receives a private key, such as private key 292 from FIG. 2B, and decrypts the trained machine learning model. Model analysis 355 is included in homomorphic encryption component 160, in some implementations. Model training processing 310 sends decrypted trained machine learning model to a model rewriter component 315. Model rewriter 315 receives the decrypted trained machine learning model and rewrites the machine learning model to generate a new machine learning model with the same structure and weights as the decrypted trained machine learning model. In some embodiments, model rewriter 315 again rewrites the new machine learning model to generate a machine learning model to be served online. Model rewriter 315 sends the machine learning model to network 120 for distribution and execution. In some implementations, model rewriter 315 is included in homomorphic encryption component 160.

In some embodiments, model building 290 makes a prediction based on input data. For example, rather than using training data 287, model building 290 uses input data that is preprocessed and encrypted in the same manner (e.g., preprocessing, tokenization, embedding, encoding and encryption in text processing component 150 and homomorphic encryption component 160). Model building 290 then classifies input data based on the trained machine learning model. In such embodiments, model building 290 initiates a downstream operation to process the input message differently than unlabeled messages. For example, model building 290 causes the input message to be flagged as abusive.

FIG. 4 is a flow diagram of an example method 400 to train machine learning models using encryption, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 400 are performed by a data processor and portions of the method 400 are performed by a model training system. For example, portions of the method 400 are performed by a data processor, e.g., a processing device, executing text processing component 150 of FIG. 1. In other embodiments, portions of the method 400 are performed by a data processor, e.g., a processing device, executing homomorphic encryption component 160 of FIG. 1. In still other embodiments, different operations of method 400 are performed by a processing device executing text processing component 150 while others are performed by a processing device executing homomorphic encryption component 160. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, a data processor, such as a processing device executing text processing component 150 and/or homomorphic encryption component 160, extracts a subset of messages. For example, text processing component 150 extracts a subset of messages (e.g., set of positive messages 250 and subset of negative messages 245 of FIG. 2A) from a set of messages (e.g., set of positive messages 250 and set of negative messages 210 of FIG. 2A) stored in a data storage system (e.g., data storage system 180 and secure data storage 205 of FIG. 2A). In some embodiments the storage is associated with a location identifier which indicates which storage a message in the subset of messages came from. In some embodiments, the messages in the set of messages include at least one of a source identifier, destination identifier, and message content (e.g., source identifier 222 or 232, destination identifier 224 or 234, and messages content 226 and 236 of FIG. 2A). In some embodiments, the messages in the subset of messages include the message content.

At operation 410, the processing device creates a set of training samples by applying at least one irreversible content processing mechanism to the subset of messages produced at operation 405. For example, a content processing mechanism, such as text processing component 150, performs text preprocessing, tokenization, and embedding on the extracted subset of messages (e.g., subset of negative messages 245 and set of positive messages 250 of FIG. 2A) to create a set of training samples.

In some embodiments, the processing device performs content processing, such as text preprocessing, to mask sensitive information included in the extracted subset of messages. For example, this sensitive information may include email addresses, URLs, dates, phone numbers, and other numbers. In some embodiments, the processing device replaces shortened expressions (e.g., apostrophes and abbreviations) and removes punctuation and extra white spaces from the extracted subset of messages.

In some embodiments, the processing device also performs tokenization on the preprocessed data and transforms the text data into a numerical representation that can be processed by machine learning algorithms (e.g., a one-hot encoded numerical 2D array). In some embodiments, the processing device also performs an embedding operation on the tokenized data to produce an embedded representation of the numerical representation. For example, text processing component 150 transforms the tokenized data into a smaller embedded space while retaining the textual information. Examples of embedding operations include but are not limited to Google Bidirectional Encoder Representations from Transformers (BERT) and Global Vectors for Word Representation (GloVe). In some embodiments, the processing device uses a non-reversible embedding operation such that the result cannot be used to reproduce the input.

At operation 415, the processing device creates an encrypted training set. For example, homomorphic encryption component 160 uses an encoding operation to transform the embedded representation into an encoded representation in a numerical space to prepare the data for encryption. In some embodiments, the processing device uses a homomorphic encryption scheme to encrypt the encoded data into ciphertext. For example, homomorphic encryption component 160 uses a homomorphic encryption scheme that preserves some mathematical structure of the data such that mathematical operations can still be performed on the encrypted training set. Further details on encryption are explained with reference to FIGS. 2A and 2B.

At operation 420, the processing device sends the encrypted training set to model training system. For example, homomorphic encryption component 160 sends an encrypted training set, such as encrypted positive data 280 and encrypted negative data 275, to a model training system, such as data merger 285 and model building 290 of FIG. 2B.

At operation 425, the processing device labels the encrypted training set. For example, data merger 285 or model building 290 labels the encrypted training set according to the location identifier indicating where the data came from. Data merger 285 or model building 290 labels encrypted positive data 280 as positive because it came from data storage system 180 and labels encrypted negative data 275 as negative because it came from secure data storage 205. In some embodiments, a positive label means that a message is abusive, and a negative label means a message is not abusive.

At operation 430, the processing device trains the machine learning model. For example, model building 290 uses the encrypted training set and associated labels (e.g., training data 287 of FIG. 2B to train a machine learning model. Further aspects of training the machine learning model are described with reference to FIGS. 2A, 2B, and 3.

In some embodiments, the processing device determines hyperparameters for building the machine learning model based on the number of operations required for the approximation of the desired operation. For example, model building 290 sets hyperparameters such that the number of operations required to approximate the desired operation does not exceed a threshold number of operations. The processing device can therefore set the hyperparameters so that the desired operation is not a complex nonlinear operation which may require an approximation using a number of operations that cause excess errors.

In some embodiments, the processing device receives an encrypted pretrained model, such as encrypted pretrained model 297 of FIG. 2B and fine tunes the encrypted pretrained model using the encrypted training set. In such embodiments, the processing device receives the encrypted pretrained model which is a homomorphically encrypted version of a pretrained model, such as pretrained model 295 of FIG. 2B, which was trained on proxies for negative messages. Using the same mathematical principles of machine learning model weights and homomorphic encryption described above, the processing device fine tunes the encrypted pretrained model using the encrypted training set.

At operation 435, the processing device decrypts the trained machine learning model. For example, model analysis 355 decrypts the trained machine learning model using a private key, such as private key 292 from FIG. 2B. In some embodiments, the processing device sends the decrypted trained machine learning model to a model rewriter, such as model rewriter 315. The model rewriter receives the decrypted trained machine learning model and rewrites the machine learning model to generate a new machine learning model with the same structure and weights as the decrypted trained machine learning model. In some embodiments, the processing device again rewrites the new machine learning model to generate a machine learning model to be served online and provides the machine learning model to a model serving system, such as application software system 130 of FIG. 1.

FIG. 5 illustrates an example machine of a computer system 500 within which a set of instructions for causing the machine to perform any one or more of the methodologies discussed herein, can be executed. In some embodiments, the computer system 500 can correspond to a component of a networked computer system (e.g., the computer system 100 of FIG. 1) that includes, is coupled to, or utilizes a machine to execute an operating system to perform operations corresponding to the text processing component 150 and/or homomorphic encryption component 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a memory 506 (e.g., flash memory, static random access memory (SRAM), etc.), an input/output system 510, and a data storage system 540, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 512 for performing the operations and steps discussed herein.

The computer system 500 can further include a network interface device 508 to communicate over network 520. Network interface device 508 can provide a two-way data communication coupling to a network. For example, network interface device 508 can be an integrated-services digital network (ISDN) card, cable modem, satellite modem, or a modem to provide a data communication connection to a corresponding type of telephone line. As another example, network interface device 508 can be a local area network (LAN) card to provide a data communication connection to a compatible LAN. Wireless links can also be implemented. In any such implementation network interface device 508 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 500.

Computer system 500 can send messages and receive data, including program code, through the network(s) and network interface device 508. In the Internet example, a server can transmit a requested code for an application program through the Internet and network interface device 508. The received code can be executed by processing device 502 as it is received, and/or stored in data storage system 540, or other non-volatile storage for later execution.

The input/output system 510 can include an output device, such as a display, for example a liquid crystal display (LCD) or a touchscreen display, for displaying information to a computer user, or a speaker, a haptic device, or another form of output device. The input/output system 510 can include an input device, for example, alphanumeric keys and other keys configured for communicating information and command selections to processing device 502. An input device can, alternatively or in addition, include a cursor control, such as a mouse, a trackball, or cursor direction keys for communicating direction information and command selections to processing device 502 and for controlling cursor movement on a display. An input device can, alternatively or in addition, include a microphone, a sensor, or an array of sensors, for communicating sensed information to processing device 502. Sensed information can include voice commands, audio signals, geographic location information, and/or digital imagery, for example.

The data storage system 540 can include a machine-readable storage medium 542 (also known as a computer-readable medium) on which is stored one or more sets of instructions 544 or software embodying any one or more of the methodologies or functions described herein. The instructions 544 can also reside, completely or at least partially, within the main memory 504 and/or within the processing device 502 during execution thereof by the computer system 500, the main memory 504 and the processing device 502 also constituting machine-readable storage media.

In one embodiment, the instructions 544 include instructions to implement functionality corresponding to a text processing component and/or a homomorphic encryption component (e.g., the text processing component 150 and/or the homomorphic encryption component 160 of FIG. 1). While the machine-readable storage medium 542 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. Terminology such as "component," "model," "processor," "device" are used herein to refer to software, hardware, or a combination of software and hardware. For example, component may refer to a software component, e.g., computer programming code stored in memory that can be read and executed by a hardware processor. Model as used herein may refer to a combination of software and stored data.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes at a data processor, (i) extracting a subset of messages from a set of messages stored at a secure storage associated with a location identifier, the messages in the set of messages each including a source identifier, a destination identifier, and message content, and the messages in the subset of messages each including the message content, (ii) creating a set of training samples by applying at least one irreversible content processing mechanism to the subset of messages, (iii) creating an encrypted training set by applying a homomorphic encryption mechanism to each sample of the set of training samples using a public key, and (iv) sending the encrypted training set to a model training system. Example 1 also includes at the model training system, (i) based on the location identifier, labeling each sample of the encrypted training set with a label to produce a labeled encrypted training set, (ii) based on the labeled encrypted training set, training the machine learning model to classify input messages with the label, for downstream routing, and (iv) decrypting the trained machine learning model using a private key associated with the public key, the private key accessible to the model training system but not the data processor.

An example 2 includes the subject matter of example 1, where the message content includes at least one of text, audio, or video and where training the machine learning model on the labeled encrypted training set includes adapting the machine learning model to a task including at least one of a speech recognition task, an image recognition task, or a text recognition task. An example 3 includes the subject matter of example 2 where the task includes detecting abusive messages and the label indicates the messages as abusive or not abusive. An example 4 includes the subject matter of any of examples 1-3, where applying at least one content processing mechanism to the subset of messages includes transforming the message content to a numerical representation and applying an embedding mechanism to the numerical representation to produce an embedded representation of the numerical representation. An example 5 includes the subject matter of example 4, where applying the homomorphic encryption mechanism to the set of training samples includes encoding the embedded representation to produce an encoded representation and encrypting the encoded representation to produce ciphertext. An example 6 includes the subject matter of example 5, where encrypting the encoded representation includes applying a Cheon, Kim, Kim and Song (CKKS) homomorphic encryption scheme to the encoded representation to produce the ciphertext, where the ciphertext comprises a homomorphically encrypted training sample. An example 7 includes the subject matter of any of examples 1-6, further including at the data processor, (i) obtaining the public key and (ii) creating the encrypted training set using the public key. An example 8 includes the subject matter of any of examples 1-7, where training the machine learning model on the encrypted training set includes, at the model training system, (i) obtaining the private key from a key management system, and (ii) decrypting the trained machine learning model using the private key. An example 9 includes the subject matter of any of examples 1-8, where training the machine learning model based on the encrypted training data includes calculating a validation loss associated with at least one training step and decrypting the validation loss. An example 10 includes the subject matter of example 9, further including determining that the decrypted validation loss satisfies a validation loss threshold and providing the trained machine learning model to a model serving system. An example 11 includes the subject matter of any of examples 1-10, further including configuring at least one hyperparameter of the machine learning model based on a selected homomorphic encryption scheme, where configuring the at least one hyperparameter is based on at least one of: a number of mathematical operations computed at a node of an artificial neural network, a number of mathematical operations computed at a layer of the artificial neural network, a total number of mathematical operations computed during a training step of the artificial neural network, or a number of layers of the artificial neural network. An example 12 includes the subject matter of any of examples 1-11, further including applying the trained machine learning model to at least one input message, by the trained machine learning model, labeling each of the at least one input message with a label, and based on the label, initiating a downstream operation to process the at least one labeled input message differently than messages to which the label is not applied. An example 13 includes the subject matter of any of examples 1-12, further including, at the model training system, (i) creating a set of training samples based on a set of message proxies that are not actual messages, (ii) labeling each training sample in the set of training samples as a negative sample, and (ii) creating a pre-training set including unencrypted negative training samples of the set of training samples. An example 14 includes the subject matter of example 13, further including, at the model training system, (i) pre-training the machine learning model on the pre-training set of negative samples, (ii) encrypting the pre-trained machine learning model, and (iii) tuning the encrypted pre-trained machine learning model based on the encrypted training set.

An example 15 includes a system for training a machine learning model to classify messages as abusive or not abusive, for downstream routing, including a data processor to extract a subset of messages from a set of messages stored at a secure storage associated with a location identifier, the messages in the set of messages each including a source identifier, a destination identifier, and message content, and the messages in the subset of messages each including the message content, creating a set of training samples by applying at least one irreversible content processing mechanism to the subset of messages, creating an encrypted training set by applying a homomorphic encryption mechanism to each sample of the set of training samples using a public key, and sending the encrypted training set to a model training system. The system also includes a model training system to label each sample of the encrypted training set as abusive or not abusive to produce a labeled encrypted training set based on the location identifier, train the machine learning model to classify input messages as abusive or not abusive based on the labeled encrypted training set, for downstream routing, and decrypt the trained machine learning model using a private key associated with the public key, the private key accessible to the model training system but not the data processor.

An example 16 includes the subject matter of example 15 where the data processor is further to obtain a set of message proxies that are not actual messages, create a set of negative training samples including a subset of the set of message proxies, wherein the set of negative training samples are labeled not abusive, extract a set of positive training samples including actual messages of the set of messages stored at the secure storage, the set of positive training samples each including the message content and labeled abusive, and create a set of pretraining samples including the set of negative training samples and the set of positive training samples, where the model training system is further to pretrain the machine learning model to classify input messages as abusive or not abusive based on the set of pretraining samples, for downstream routing and, in response to pretraining the machine learning model, send the machine learning model to the data processor, and the data processor is still further to receive the machine learning model and encrypt the machine learning model by applying the homomorphic encryption mechanism to the machine learning model using the public key, where training the machine learning model to classify input messages as abusive or not abusive occurs after encrypting the machine learning model. An example 17 includes the subject matter of any of examples 15 and 16, where applying at least one content processing mechanism to the subset of the set of actual messages includes transforming the actual messages to a numerical representation and applying an embedding mechanism to the numerical representation to produce an embedded representation of the numerical representation. An example 18 includes the subject matter of example 17, where applying the homomorphic encryption mechanism to the set of training samples includes encoding the embedded representation to produce an encoded representation and encrypting the encoded representation to produce ciphertext. An example 19 includes the subject matter of example 18, where encrypting the encoded representation includes applying a Cheon, Kim. Kim and Song (CKKS) homomorphic encryption scheme to the encoded representation to produce the ciphertext, where the ciphertext includes homomorphically encrypted training sample. An example 20 includes the subject matter of any of examples 15-19, where training the machine learning model includes calculating a validation loss associated with at least one training step and decrypting the validation loss.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for securely training a machine learning model to classify messages, the method comprising:
at a model training system, (i) creating a pre-training set comprising unencrypted negative training samples, and (ii) pre-training the machine learning model on the pre-training set of negative samples to produce a pre-trained machine learning model;
at a data processor, (i) encrypting the pre-trained machine learning model by applying a homomorphic encryption mechanism to the pre-trained machine learning model using a public key, (ii) extracting a subset of messages from a set of messages stored at a storage associated with a location identifier, the messages in the set of messages each comprising a source identifier, a destination identifier, and message content, and the messages in the subset of messages each comprising the message content, (iii) creating a set of training samples by applying at least one irreversible content processing mechanism to the subset of messages, (iv) creating an encrypted training set by applying the homomorphic encryption mechanism to each sample of the set of training samples using the public key, and (v) sending the encrypted training set to a model training system; and
at the model training system, (i) based on the location identifier, labeling each sample of the encrypted training set with a label used for downstream routing to produce a labeled encrypted training set, (ii) based on the labeled encrypted training set, further training the pre-trained machine learning model to classify input messages with the label, wherein training the pre-trained machine learning model to classify the input messages with the label occurs after the data processor encrypts the pre- trained machine learning model, and (iii) decrypting the trained machine learning model using a private key associated with the public key, the private key accessible to the model training system but not the data processor.

2. The method of claim 1, wherein:
the message content comprises at least one of text, audio, or video; and
training the pre-trained machine learning model on the labeled encrypted training set comprises adapting the pre-trained machine learning model to a task comprising at least one of a speech recognition task, an image recognition task, or a text recognition task.

3. The method of claim 2, wherein the task comprises detecting abusive messages and the label indicates the messages as abusive or not abusive and wherein the pre-training set of negative samples are labeled not abusive.

4. The method of claim 1, wherein applying at least one content processing mechanism to the subset of messages comprises:
transforming the message content to a numerical representation; and
applying an embedding mechanism to the numerical representation to produce an embedded representation of the numerical representation.

5. The method of claim 4, wherein applying the homomorphic encryption mechanism to the set of training samples comprises:
encoding the embedded representation to produce an encoded representation; and
encrypting the encoded representation to produce ciphertext.

6. The method of claim 5, wherein encrypting the encoded representation comprises:
applying a Cheon, Kim, Kim and Song (CKKS) homomorphic encryption scheme to the encoded representation to produce the ciphertext, wherein the ciphertext comprises a homomorphically encrypted training sample.

7. The method of claim 1, further comprising:
at the data processor, (i) obtaining the public key and (ii) creating the encrypted training set using the public key.

8. The method of claim 1, wherein training the pre-trained machine learning model on the encrypted training set comprises:
at the model training system, (i) obtaining the private key from a key management system, and (ii) decrypting the pre-trained trained machine learning model using the private key.

9. The method of claim 1, wherein training the pre-trained machine learning model based on the encrypted training set comprises:
calculating a validation loss associated with at least one training step; and
decrypting the validation loss.

10. The method of claim 9, further comprising:
determining that the decrypted validation loss satisfies a validation loss threshold; and
providing the trained machine learning model to a model serving system.

11. The method of claim 1, further comprising:
configuring at least one hyperparameter of the pre-trained machine learning model based on a selected homomorphic encryption scheme, wherein configuring the at least one hyperparameter is based on at least one of:
a number of mathematical operations computed at a node of an artificial neural network;
a number of mathematical operations computed at a layer of the artificial neural network;
a total number of mathematical operations computed during a training step of the artificial neural network; or
a number of layers of the artificial neural network.

12. The method of claim 1, further comprising:
applying the trained machine learning model to at least one input message;
by the trained machine learning model, labeling each of the at least one input message with a label; and
based on the label, initiating a downstream operation to process the at least one labeled input message differently than messages to which the label is not applied.

13. The method of claim 1, wherein creating the pre-training set comprising the unencrypted negative training samples further comprises:

at the model training system, (i) creating the unencrypted negative training samples based on a set of message proxies that are not actual messages, and (ii) labeling each of the unencrypted negative training samples in as a negative sample.

14. The method of claim 1, further comprising:

at the model training system, (i) extracting a set of positive training samples comprising actual messages of the set of messages stored at the storage, the set of positive training samples each comprising the message content and labeled positive and (ii) creating the pre-training set using the unencrypted negative training samples and the set of positive training samples.

15. A system for securely training a machine learning model to classify messages as abusive or not abusive, the system comprising:

a data processor; and a model training system coupled to the data processor;

wherein the model training system is to (i) create a pre-training set comprising unencrypted negative training samples, wherein the unencrypted negative training samples are labeled not abusive and (ii) pre-train the machine learning model on the pre-training set of negative samples to produce a pre-trained machine learning model;

wherein the data processor is to (i) encrypt the pre-trained machine learning model by applying a homomorphic encryption mechanism to the pre-trained machine learning model using a public key, (ii) extract a subset of messages from a set of messages stored at a storage associated with a location identifier, the messages in the set of messages each comprising a source identifier, a destination identifier, and message content, and the messages in the subset of messages each comprising the message content, (iii) create a set of training samples by applying at least one irreversible content processing mechanism to the subset of messages, (iv) create an encrypted training set by applying the homomorphic encryption mechanism to each sample of the set of training samples using the public key, and (iv) send the encrypted training set to the model training system; and wherein the model training system is further to (i) based on the location identifier, label each sample of the encrypted training set as abusive or not abusive to produce a labeled encrypted training set, (ii) based on the labeled encrypted training set, further train the pre-trained machine learning model to classify input messages as abusive or not abusive, for downstream routing, wherein training the pre-trained machine learning model to classify the input messages as abusive or not abusive occurs after the data processor encrypts the pre-trained machine learning model, and (iii) decrypt the trained machine learning model using a private key associated with the public key, the private key accessible to the model training system but not the data processor.

16. The system of claim 15, wherein:

the data processor is further to create the pre-training set comprising the unencrypted negative training samples by (i) obtaining a set of message proxies that are not actual messages, (ii) creating the pre-training set comprising the unencrypted negative training samples using a subset of the set of message proxies, (iii) extracting a set of positive training samples comprising actual messages of the set of messages stored at the storage, the set of positive training samples each comprising the message content and labeled abusive, and (iv) creating the pre-training set comprising the unencrypted negative training samples and the set of positive training samples.

17. The system of claim 15, wherein applying at least one content processing mechanism to the subset of messages comprises:

transforming the subset of messages to a numerical representation; and applying an embedding mechanism to the numerical representation to produce an embedded representation of the numerical representation.

18. The system of claim 17, wherein applying the homomorphic encryption mechanism to the set of training samples comprises:

encoding the embedded representation to produce an encoded representation; and encrypting the encoded representation to produce ciphertext.

19. The system of claim 18, wherein encrypting the encoded representation comprises:

applying a Cheon, Kim, Kim and Song (CKKS) homomorphic encryption scheme to the encoded representation to produce the ciphertext, wherein the ciphertext comprises a homomorphically encrypted training sample.

20. The system of claim 15, wherein training the pre-trained machine learning model comprises:

calculating a validation loss associated with at least one training step; and decrypting the validation loss.

* * * * *